US006618736B1

(12) United States Patent
Menage

(10) Patent No.: US 6,618,736 B1
(45) Date of Patent: Sep. 9, 2003

(54) TEMPLATE-BASED CREATION AND ARCHIVAL OF FILE SYSTEMS

(75) Inventor: Paul Menage, Sunnyvale, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/802,613

(22) Filed: Mar. 9, 2001

(51) Int. Cl.[7] .......................... G06F 17/30; G06F 12/00
(52) U.S. Cl. ...................... 707/204; 707/202; 707/203; 707/8
(58) Field of Search ................................ 707/202, 201, 707/203, 204, 8

(56) References Cited

U.S. PATENT DOCUMENTS

| 3,377,624 | A |   | 4/1968  | Nelson et al.                   |
|-----------|---|---|---------|---------------------------------|
| 4,177,510 | A |   | 12/1979 | Appell et al. ............ 364/200 |
| 5,088,026 | A | * | 2/1992  | Bozman et al. ........... 395/425 |
| 5,226,160 | A |   | 7/1993  | Waldron et al.                  |
| 5,263,147 | A |   | 11/1993 | Francisco et al. ......... 395/425 |
| 5,528,753 | A |   | 6/1996  | Fortin                          |
| 5,603,020 | A |   | 2/1997  | Hashimoto et al. ........ 395/616 |
| 5,636,371 | A |   | 6/1997  | Yu .......................... 395/500 |
| 5,692,047 | A |   | 11/1997 | McManis ...................... 380/4 |
| 5,706,097 | A |   | 1/1998  | Schelling et al. .......... 358/296 |
| 5,706,504 | A | * | 1/1998  | Atkinson et al. .......... 707/100 |
| 5,715,441 | A | * | 2/1998  | Atkinson et al. .............. 707/1 |
| 5,761,477 | A |   | 6/1998  | Wahbe et al. .......... 395/406 A |
| 5,781,550 | A |   | 7/1998  | Templin et al. ........... 370/401 |
| 5,809,527 | A |   | 9/1998  | Cooper et al. ............ 711/133 |
| 5,819,292 | A |   | 10/1998 | Hitz et al. ................ 707/203 |
| 5,828,893 | A |   | 10/1998 | Weid et al. ............... 395/800 |
| 5,838,916 | A |   | 11/1998 | Domenikos et al. ... 395/200.49 |
| 5,842,002 | A |   | 11/1998 | Schnurer et al. .......... 395/500 |
| 5,845,129 | A |   | 12/1998 | Wendorf et al. ........... 395/726 |
| 5,913,024 | A |   | 6/1999  | Green et al. ............... 395/186 |
| 5,915,085 | A |   | 6/1999  | Koved ....................... 395/186 |
| 5,918,018 | A |   | 6/1999  | Gooderum et al. .... 395/200.55 |
| 5,937,159 | A |   | 8/1999  | Meyers et al. ......... 395/187.01 |
| 5,956,481 | A |   | 9/1999  | Walsh et al. ............... 395/186 |
| 5,963,962 | A |   | 10/1999 | Hitz et al. ................. 707/202 |
| 6,023,721 | A |   | 2/2000  | Cummings ................. 709/201 |
| 6,065,118 | A |   | 5/2000  | Bull et al. .................. 713/200 |
| 6,075,938 | A |   | 6/2000  | Bugnion et al. ....... 395/500.48 |
| 6,108,759 | A |   | 8/2000  | Orcutt et al. ............... 711/173 |
| 6,125,367 | A | * | 9/2000  | NA ........................... 707/104 |
| 6,167,520 | A |   | 12/2000 | Touboul .................... 713/200 |
| 6,192,389 | B1|   | 2/2001  | Ault et al. ................. 709/101 |
| 6,192,512 | B1|   | 2/2001  | Chess ........................... 717/5 |
| 6,353,837 | B1| * | 3/2002  | Blumenau .................. 707/205 |

FOREIGN PATENT DOCUMENTS

WO    WO 99/39261    8/1999

OTHER PUBLICATIONS

Boehm, B., "Managing Software Productivity and Reuse," IEEE Computer, vol. 32, No. 9, Sep. 1999, 3 pages.
Corbato, F. J. et al. "An Experimental Timesharing System," Proceedings of the American Federation Of Information Processing Societies Spring Joint Computer Conference, San Francisco, CA, May 1–3, 1962, pp. 335–344.
Deutsch, P. and Grant, C.A., "A Flexible Measurement Tool for Software Systems," Information Processing 71 (Proc. of the IFIP Congress), 1971, pp. 320–326.

(List continued on next page.)

Primary Examiner—Frantz Coby
(74) Attorney, Agent, or Firm—Fenwick & West LLP

(57) ABSTRACT

File systems are created and archived by providing a set of shared storage units and one or more templates, each template including a set of private storage units and a corresponding usage map.

53 Claims, 12 Drawing Sheets

OTHER PUBLICATIONS

Edjlali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp. 1–17.

Erlingsson, U. and Schneider, F. B., IRM Enforcement of Java Stack Inspection, [online], Feb. 19, 2000, [retrieved on Apr. 2, 2002]. Retrieved from the Internet: <URL: tr.cs.cornell.edu/Diens/U12.0/Show Page/ncstrl.cornell/TR2000–1786>.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R.P., "Survey of Virtual Machine Research," IEEE Computer, Jun. 1974, pp. 34–45.

Pandey, R. and Hashii, B., "Providing Fine–Grained Access Control For Mobile Programs Through Binary Editing," Technical Report TR98 08, University of California, Davis, CA, 1998, pp. 1–22.

Ritchie, D. M., "The Evolution of the Unix Time–Sharing System," AT&T Bell Laboratories Technical Journal 63, No. 6, Part 2, Oct. 1984, (originally presented 1979), 11 pages.

Saltzer, J., H. and Schroeder, M.D., The Protection of Information in Computer Systems, [online], 1973, [retrieved on Apr. 2, 2002]. Retrieved from the Internet:<URL: cs.virginia.edu~evans/cs551/saltzer/>.

Wahbe, R., et al., "Efficient Software–Based Fault Isolation," Proc. of the Symposium on Operating System Principles, 1993, 14 pages.

Keshav, S., An Engineering Approach to Computer Networking: ATM Networks, the Internet, and the Telephone Network, Reading, MA, Addison–Wesley, 1997, pp. vii–xi, 85–115, 209–355, 395–444.

Stevens, R. W., UNIX Network Programming vol. 1 Networking APIs: Sockets and XTI, Upper Saddle River, NJ, Prentice hall, 1998, pp. v–xiv, 29–53, 85–110, 727–760.

Tanenbaum, A. S. and Woodhull, A. S., Operating Systems: Design and Implementation, Upper Saddle River, NJ, Prentice Hall, 1997, pp. vii–xiv, 1–46, 401–454.

Rubini, A., LINUX Device Drivers, Sebastopol, CA, O'Reilly & Associates, Inc., 1998, pp. v–x, 13–40.

Goyal, P., et al., "A Hierarchical CPU Scheduler for Multimedia Operating Systems," Proceedings of the Second Symposium on Operating Design and Implementations (OSDI'96), Seattle, WA, Oct. 1996, 15 pages.

Laurie, B. and Laurie, P., Apache The Definitive Guide, Sebastopol, CA, O'Reilly & Associates, Inc., Feb. 1999, pp. v–viii, 43–74.

Aho, A. V. and Ullman J. D.,Principles of Complier Design, Reading, MA, 1977, pp. vii–x, 359–362, 519–522.

Jonsson, J., "Exploring the Importance of Preprocessing Operations in Real–Time Multiprocessor Scheduling," Proc. of the IEEE Real–Time Systems Symposium—Work–in–Progress session, San Francisco, CA, Dec. 4, 1997, pp. 31–34.

Rusling, D. A., Processes, [online], [retrieved on Dec. 7, 1999]. Retrieved from the Internet: <URL: cebaf.gov/~saw/linux/tlk–htm/node44.html>.

Rusling, D. A., Linux Processes, [online], [retrieved on Dec. 7, 1999]. Retrieved from the Internet: cebaf.gov/~saw/linux/tlk–htm/node45.html>.

Rusling, D. A., Identifiers, [online], [retrieved on Dec. 7, 1999]. Retrieved from the Internet: cebaf.gov/linux/tlk–htm/node46.html>.

Rusling, D. A., Scheduling, [online], [retrieved on Dec. 7, 1999]. Retrieved from the Internet: <URL: cebaf.gov/~saw/linux/tlk–htm/node47.html>.

Rusling, D. A., Scheduling in Multiprocessor Systems, [online], [retrieved on Dec. 7, 1999]. Retrieved from the Internet: cebaf.gov/~saw/linux/tlk–htm/node48.html>.

Rusling, D. A., Files, [online], [retrieved on Dec. 7, 1999]. Retrieved from the Internet: <URL: cebaf.gov/~saw/linux/tlk–htm/node49.html>.

Plummer, D. C., An Ethernet Address Resolution Protocol—or—Converting Network Protocol Addresses to 48.bit Ethernet Address for Transmission on Ethernet Hardware, Nov. 1982, [online], [retrieved on Jan. 17, 2000]. Retrieved from the Internet: <URL: msg.net/kadow/answers/extras/rfc/rfc826.txt>.

Huang, X. W. et al., "The ENTRAPID Protocol Development Environment," Proceedings of IEEE Infocom'99, Mar. 1999, nine pages.

Duffield, N.G., et al., "A Flexible Model for Resource Management in Virtual Private Networks," Computer Communication Review Conference, Computer Communication, ACM SIGCOMM '99 Conference, Cambridge, MA, Aug. 30, 1999–Sep. 3, 1999, pp. 95–108.

Campbell, A. T. and Keshav, S., "Quality of Service in Distributed Systems," Computer Communications 21, 1998, pp. 291–293.

Bach, M. J., The Design of the Unix® Operating System, New Delhi, Prentice–Hall of India, 1989, pp. v–x, 19–37.

McDougall, R., et al., Resource Management, Upper Saddle River, NJ, Prentice–Hall, 1999, pp. iii–xix, 135–191.

Rijsinghani, A., RFC 1624, May 1994, [online], [retrieved Feb. 2, 2000]. retrived from the internet: faqs.org/rfcs/rfc1624.html>.

Mallory, T and Kullberg, A., RFC 1141, Jan. 1990 [online], [retrieved Feb. 2, 2000]. retrieved from the Internet: faqs.org/rfcs/rfc1141.html>.

Egevang, K. and Francis P., RFC 1631, May 1994 [online], [retrieved Feb. 2, 2000]. retrieved from the internet: faqs.org/rfcs/rfc1631.html>.

Goyal, P. et al., "Start–time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved fromt the Internet: <URL:http://cs.cornell.edu/Info/Courses/Spring–97/CS614/goy.html>.

Goyal, P., "Packet Scheduling Algorithms for Integrated Services Networks," PhD Dissertation, University of Texas, Austin, TX, Aug. 1997.

Pending United States patent application entitled "Providing Quality of Service Guarantees to Virtual Hosts," serial No. 09/452,286, filing date Nov. 30, 1999.

Pending United States patent application entitled "Selective Interception of System Calls," serial No. 09/499,098, filing date Feb. 4, 2000.

Pending United States patent application entitled "Dynamic Scheduling of Task Streams in a Multiple–Resource System to Ensure Task Stream Quality of Service," serial No. 09/498,450, filing date Feb. 4, 2000.

Pending United States patent application entitled "Disambiguating File Descriptors," serial No. 09/500,212, filing date Feb. 8, 2000.

Pending United States patent application entitled "Restricting Communication Between Network Devices on a Common Network," serial No. 09/502,155, filing date Feb. 11, 2000.

Pending United States patent application entitled "Enabling a Service Provider to Provide Intranet Services," serial No. 09/526,980, filing date Mar. 15, 2000.

Pending United States patent application entitled "Dynamically Modifying the Resources of a Virtual Server," serial No. 09/569,371, filing date May 11, 2000.

Pending United States patent application entitled "Regulating File Access Rates According to File Type," serial No. 09/572,672, filing date May 16, 2000.

Pending United States patent application entitled "Modifying Internal Components of a Running Operating System," serial No. 09/576,393, filing date May 22, 2000.

Pending United States patent application entitled "Associating Identifiers With Virtual Processes," serial No. 09/611,877, filing date Jul. 7, 2000.

Pending United States patent application entitled "Fairly Partitioning Resources While Limiting the Maximum Fair Share," serial No. 09/633,575, filing date Aug. 7, 2000.

Pending United States patent application entitled "Intercepting I/O Multiplexing Operation Involving Cross Domain File Descriptor Sets," serial No. 09/664,914, filing date Sep. 18, 2000.

Pending United States patent application entitled "Virtualizing Port Addresses for Non–Conflicting Use by Multiple Virtual Processes," serial No. 09/679,396, filing date Oct. 3, 2000.

Pending United States patent application entitled "Intercepting Calls to Non–Local Procedures," serial No. 09/687,031, filing date Oct. 12, 2000.

Pending United States patent application entitled "Virtualizing Super–User Privileges for Multiple Virtual Processes," serial No. 09/747,687, filing date Dec. 22, 2000.

Pending United States patent application entitled "Virtualizing Resource Ownership For Multiple Virtual Processes," serial No. 09/747,664, filing date Dec. 22, 2000.

Brown, K. et al., SnapMirrr and SnapRestore: Advances in Snapshot Technology, [online], [retrieved on Jul. 2, 2001]. Retrieved from the Internet: <URL:http://www.netapp.com/tech_library/3043.print>.

HOWTO: Multi Disk system Tuning: Technologies, [online], [retrieved Jul. 2, 2001]. Retrieved from the Internet: linux.com/howto/Multi–Disk–HOWTO–6.html?printable=yes>.

Almesberger, W., The truth about IFS, Mar. 3, 1998, [online], [retrieved Jun. 6, 2001]. Retrieved from the Internet: epfl.ch/~almesber/ifs.html>.

Hendricks, D., The Translucent File Service, [online], [retrieved Jun. 6, 2001]. Retrieved from the Internet: sun.com/smcc/solaris–migration/docs/postscript/tfs.ps>.

* cited by examiner

TEMPLATE-BASED CREATION AND ARCHIVAL OF FILE SYSTEMS

BACKGROUND

1. Field of the Invention

The present invention relates generally to computer operating systems and, more particularly, to techniques for template-based creation and archival of file systems.

2. Description of the Background Art

With the popularity and success of the Internet, server technologies are of great commercial importance today. An individual server application typically executes on a single physical host computer, servicing client requests. However, providing a unique physical host for each server application is expensive and inefficient.

For example, commercial hosting services are often provided by an Internet Service Provider (ISP), which generally provides a separate physical host computer for each customer on which to execute a server application. However, a customer purchasing hosting services will often neither require nor be amenable to paying for use of an entire host computer. In general, an individual customer will only require a fraction of the processing power, storage, and other resources of a host computer.

Accordingly, hosting multiple server applications on a single physical computer would be desirable. In order to be commercially viable, however, every server application would need to be isolated from every other server application running on the same physical host. Clearly, it would be unacceptable to customers of an ISP to purchase hosting services, only to have another server application program (perhaps belonging to a competitor) access the customer's data and client requests. Thus, each server application program needs to be isolated, receiving requests only from its own clients, transmitting data only to its own clients, and being prevented from accessing data associated with other server applications.

Furthermore, it is desirable to allocate varying specific levels of system resources to different server applications, depending upon the needs of, and amounts paid by, the various customers of the ISP. In effect, each server application needs to be a "virtual private server," simulating a server application executing on a dedicated physical host computer.

Such functionality is unavailable on traditional server technology because, rather than comprising a single, discrete process, a virtual private server must include a plurality of seemingly unrelated processes, each performing various elements of the sum total of the functionality required by the customer. Because each virtual private server includes a plurality of processes, it has been impossible using traditional server technology for an ISP to isolate the processes associated with one virtual private server from those processes associated with other virtual private servers.

Another difficulty in implementing multiple virtual private servers within a single physical host involves providing each server with a separate file system. A file system is an organized accumulation of data within one or more physical storage devices, such as a hard disk drive or RAID (redundant array of inexpensive disks). The data is typically organized into "files," such as word processing documents, spreadsheets, executable programs, and the like. The files are stored within a plurality of "storage units" of the storage device, sometimes referred to as "disk blocks" or "allocation units."

Unfortunately, providing a separate physical device for storing the file system of each virtual private server would be expensive and inefficient. Accordingly, it would be desirable to store the file systems of multiple virtual private servers within the same physical device or comparatively small set of devices.

ServerXchange®, a product of Ensim Corporation, provides multiple virtual processes, such as virtual private servers, with separate file systems. Each file system is stored in a linear set of equal-sized storage units within the same physical storage device.

This approach still presents a number of difficulties, however. For example, an initial file system, including standard applications, utilities, databases, etc., must be duplicated for each virtual private server. Such a duplication process results in copying large amounts of data from one disk location to another, consuming significant amounts of time and placing substantial memory and disk load on the physical server. Such extensive duplication also results in wasted storage space, since all or part of the resulting file systems are identical.

The above approach also presents difficulties when archiving (e.g., backing up) the file systems. For example, since the file systems are being constantly changed by activity within the virtual private servers, it is impossible to obtain a backup that is a "snapshot" of the files systems at a particular time. By the time the backup process is complete (which may take several hours), the file systems will have changed substantially. In addition, backing up such file systems may result in a substantial waste of time and storage space due to the archival of duplicate data for each file system.

Accordingly, what is needed is a technique for creating separate file systems for a plurality of virtual private servers that does not require extensive copying or wasted storage space. What is also needed is a technique for efficiently backing up a file system of a virtual private server in which a snapshot of the file system may be obtained at a particular point in time.

SUMMARY OF THE INVENTION

The present invention relates to systems and methods for file system creation and archival. In one embodiment, first and second sets of storage units are provided, each storage unit of the first set corresponding to a storage unit of the second set. The sets of storage units may be contained within a single storage device or within a comparatively small set of devices.

In addition, a usage map is provided for indicating which storage units of the second set contain valid data. The usage map is initially reset or "initialized" to indicate that none of the storage units of the second set contain valid data.

An attempt to write a data item to a storage unit of the first set is then intercepted. Rather than writing the data item to the storage unit of the first set, however, the data item is written to the corresponding storage unit of the second set. Thereafter, an indication is stored in the usage map that the corresponding storage unit of the second set contains valid data.

Additionally, an attempt to read a data item from a storage unit of the first set is intercepted. If the usage map indicates that the corresponding storage unit of the second set contains valid data, the data item is read from the corresponding storage unit of the second set. If, however, the usage map indicates that the corresponding storage unit of the second set does not contain valid data, the data item is read from the specified storage unit of the first set.

Each set of private storage units and corresponding usage map are referred to herein as a "template." In accordance with the present invention, file systems are represented as "stacks" of templates, in which all data is written to an "active" template at the "top" of the stack, and all data is read from the topmost template in the stack for which an indication of valid data is found in the corresponding usage map.

Private storage units of a template that is not currently the active template may be backed up to a storage device in order to obtain a "snapshot" of the changes to an initial file system at a particular point in time.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. Those skilled in the art will readily recognize from the following discussion that alternative embodiments of the illustrated structures and methods may be employed without departing from the principles of the invention described herein.

DETAILED DESCRIPTION OF THE PREFERRED EMBODIMENTS

The present invention relates to file system creation and archival, particularly in the context of multiple virtual private servers running on a single physical host machine.

As previously noted, implementing a virtual private server using traditional server technologies has been impossible because, rather than comprising a single, discrete process, a virtual private server must include a plurality of seemingly unrelated processes, each performing various elements of the sum total of the functionality required by a customer. A virtual private server is an example of a "virtual process," which is a set of processes isolated partially or totally from other processes of the system.

Accordingly, one aspect of the present invention relates to a system and method for associating identifiers with virtual processes (e.g., virtual private servers) as described immediately below. Thereafter, a system and method are described for file system creation and archival in the context of multiple virtual private servers.

I. Associating Identifiers With Virtual Processes

Figure 1:
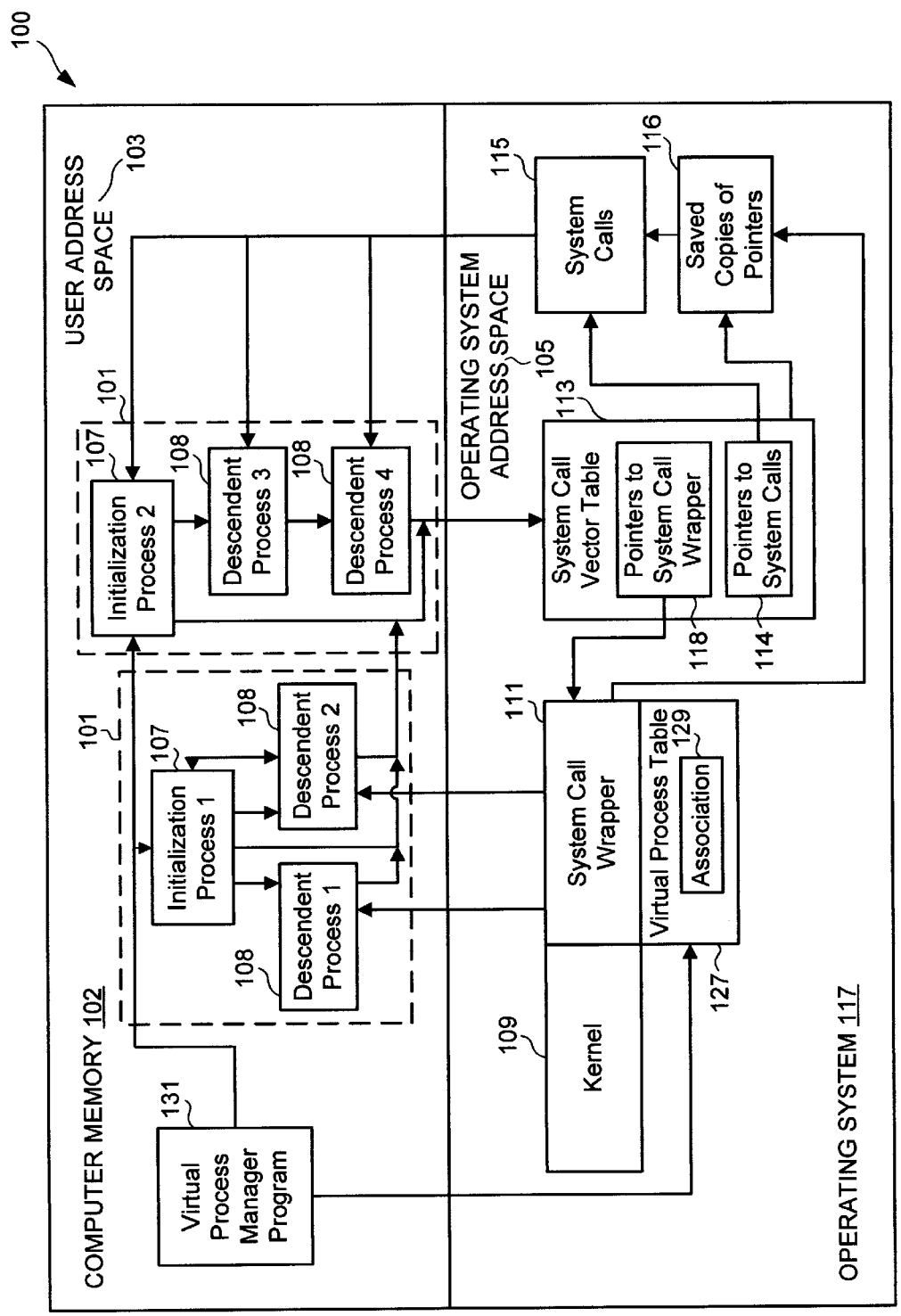
FIG. 1 is a block diagram of a system for associating identifiers with virtual processes.

FIG. 1 is a high-level schematic block diagram of a system 100 for associating identifiers with virtual processes 101 according to one embodiment of the present invention. A computer memory 102 includes a user address space 103 and an operating system address space 105. Multiple initialization processes 107 execute in the user address space 103. Although FIG. 1 illustrates only two initialization processes 107 executing in the user address space 103, those skilled in the art will understand that more than two initialization processes 107 can execute simultaneously within a given computer memory 102.

Also executing in the user address space 103 are one or more descendent processes 108 originating from the initialization processes 107. A descendent process 108 is a child process of an initialization process 107, or a child process thereof, extended to any number of generations of subsequent child processes. Although FIG. 1 illustrates only two descendent processes 108 for each initialization process 107, fewer or more than two descendent processes 108 per initialization process 107 can execute simultaneously within a given computer memory 102.

In one embodiment, a virtual process table 127 or other suitable data structure for storing associations 129 between executing processes 107,108 and virtual processes 101 is inserted into the operating system 117. Of course, other data structures may be used to store associations 129, one example of which is a linked list.

In various embodiments, the virtual process table 127 (or other data structure) is dynamically loaded into the operating system kernel 109 while the kernel 109 is active. In another embodiment, the virtual process table 127 is stored in the user address space 103. The maintenance and use of the virtual process table 127 is discussed in detail below.

Those skilled in the art will recognize that a virtual process 101 is not an actual process that executes in the computer memory 102. Instead, the term "virtual process" describes a collection of associated functionality. For example, a virtual process 101 is not actually a discrete process, but instead, comprises a plurality of actual processes that together provide the desired functionality, thereby simulating the existence of a single application executing on a dedicated physical host. Each actual process that performs some of the functionality of the application is a part of the virtual process 101. As shown in FIG. 1, for example, initialization process 1 and descendent processes 1 and 2 together comprise one virtual process 101, whereas initialization process 2 and descendent processes 3 and 4 together comprise another.

In order to associate a specific identifier with each actual process that is a member of a virtual process 101, a separate system initialization process 107 is started for each virtual process 101. Normally, each process executing on a multitasking operating system such as UNIX® is descended from a single system initialization process 107 that is started when the operating system 117 is booted. However, the system 100 uses techniques described in detail below to start a separate system initialization process 107 for each virtual process 101. When each system initialization process 107 is started, an association 129 between the system initialization process 107 and the virtual process 101 is stored in the virtual process table 127. All additional processes that are descended from a given initialization process are thus identified with the virtual process 101 associated with that initialization process.

In one embodiment, rather than starting a separate system initialization process 107 for each virtual process 101, a custom initialization process is started. In this embodiment, all processes that are a members of a specific virtual process 101 are descended from the associated custom initialization process, and are associated with the virtual process 101 with which the custom initialization process is associated. The exact functionality included in the custom initialization process is a design choice that can be made by, for example, a system administrator.

System calls 115 that generate child processes (e.g., the UNIX® fork( ) and clone( ) functions) are intercepted so that the child processes can be associated with the virtual process 101 with which the parent process is associated. In one embodiment, a system call wrapper 111 is used to intercept system calls 115, which is dynamically loaded into the operating system kernel 109 while the kernel 109 is active. In another embodiment, the system call wrapper 111 is loaded into the user address space 103. Of course, various other techniques may be used to intercept the system calls 115, which are well known in the art.

Pointers 114 to the system calls 115 are located in an operating system call vector table 113. Those skilled in the art will recognize that the term "system call vector table," as used herein, denotes an area in the operating system address space 105 in which addresses of system calls are stored. In the UNIX® operating system, this part of the operating system is called the "system call vector table," and that term is used throughout this description. Other operating systems employ different terminology to denote the same or similar system components. The pointers 114, themselves, are sometimes referred to as "system call vectors."

A copy 116 is made of a pointer 114 to each system call 115 to be intercepted. These copies 116 of pointers 114 may be stored in the operating system address space 105, but in an alternative embodiment, are stored in the user address space 103. Once the copies 116 have been made and saved, the pointers 114 in the system call vector table 113 to the system calls 115 to be intercepted are replaced with pointers 118 to the system call wrapper 111, such that when a system call 115 to be intercepted is made, the system call wrapper 111 executes instead.

In one embodiment, the system call wrapper 111 performs the process of copying, storing, and replacing of pointers. In other embodiments, the process of copying, storing, and replacing of pointers is performed by a pointer management module (not shown) executing in either the operating system address space 105 or the user address space 103, as desired. The pointer management module may either be a stand alone program or a component of a larger application program.

By intercepting a system call 115, alternative code is executed. The steps of inserting a system call wrapper 111 into the operating system 117, making a copy 116 of an operating system pointer 114 to a system call 115, and replacing the operating system pointer 114 with a pointer 118 to the system call wrapper 111 facilitate interception of a system call 115. When a system call 115 to be intercepted is made, the operating system 117 uses the pointer 118 in the system call vector table 113 to the system call wrapper 111 to execute the system call wrapper 111.

In one embodiment, only the system calls 115 that create child processes need be intercepted, and thus only the pointers 114 to the system calls 115 to be intercepted are replaced with the pointers 118 to the system call wrapper 111. The pointers 114 to the system calls 115 which are not to be intercepted are not replaced. Thus, when a non-intercepted system call 115 is made, the actual system call 115 executes, not the system call wrapper 111.

The various initialization processes 107 and descendent processes 108 execute in the user address space 103 under control of the operating system 117 and make system calls 115. When a process makes a system call 115 that creates a child process, the system call wrapper 111 reads the virtual process table 127, and determines whether the process that made the system call (the parent of the child process being created) is associated with a virtual process 101. If so, the system call wrapper 111 uses the saved copy of the pointer 116 to execute the system call 115, allowing the creation of the child process.

The system call wrapper 111 then updates the virtual process table 127, storing an association 129 between the newly created child process and the virtual process 101 with which the process that made the system call is associated. Thus, all descendent processes 108 are associated with the virtual process 101 with which their parent process is associated.

In one embodiment, the initialization processes 107 are started by a virtual process manager program 131 executing in the user address space 103. The virtual process manager program 131 modifies the operating system 117 of the computer to include the virtual process table 127. In one embodiment, the manager program 131 loads the virtual process table 127 into the kernel 109 of the operating system 117 while the kernel is active.

For each virtual process 101, the manager program 131 starts an initialization process 107 from which all other processes that are part of the virtual process 101 will originate as descendent processes 108. Each time the manager program 131 starts an initialization process 107 for a virtual process 101, the manager program 131 stores, in the virtual process table 127, an association 129 between the initialization process 107 and the appropriate virtual process 101. Subsequently, all additional processes that are part of the virtual process 101 will be originated from the initialization process, and thus associated with the appropriate virtual process 101.

For example, in this embodiment, the manager program 131 can start a first virtual process 101. To do so, the manager program 131 starts an initialization process 107 for the virtual process 101, storing an association 129 between the initialization process 107, and a virtual process identifier for the virtual process 101. Additional processes that are part of the virtual process 101 originate from the initialization process 107, and are associated with the virtual process identifier of the virtual process 101. The manager program 131 can proceed to start a second virtual process 101 by starting a separate initialization process 107, and associating the second initialization process 107 with a separate virtual process identifier for the second virtual process 101. Consequently, all of the processes associated with the second virtual process 101 will be associated with the appropriate virtual process identifier. In this manner, multiple virtual processes 101 on the same physical computer are each associated with unique identifiers.

In an alternative embodiment, the virtual process manager program 131 can be implemented as a modified loader program. A loader program is an operating system utility that is used to execute computer programs that are stored on static media. Typically, a loader program loads an executable image from static media into the user address space 103 of the computer memory 102, and then initiates execution of the loaded image by transferring execution to the first instruction thereof.

Like a standard loader program, a modified loader program loads executable images (in this case, initialization processes 107) from static media into the user address space 103. Additionally, the modified loader program stores, in the virtual process table 127, an association 129 between the initialization process 107 being loaded and the appropriate virtual process 101. Thus, for each virtual process 101, an initialization process 107 is loaded by the modified loader program, and an association between the initialization process 107 and the virtual process 101 is stored in the virtual process table 127. Subsequently, additional processes that are part of the virtual process 101 originate from the associated initialization process 107, and are thus associated with the virtual process 101, as described above.

In another embodiment, the modified loader program loads all processes that are part of each virtual process 101. In that embodiment, whenever the modified loader program loads a process, the modified loader program also stores, in the virtual process table 127, an association 129 between the loaded process and the appropriate virtual process 101.

II. File System Creation and Archival

As previously noted, one of the difficulties in implementing multiple virtual private servers within a single physical host involves providing each server with a separate file system. A file system is an organized accumulation of data within one or more physical storage devices, such as a hard disk drive or RAID (redundant array of inexpensive disks). The data is typically organized into "files," such as word processing documents, spreadsheets, executable programs, and the like. The files are stored within a plurality of "storage units" of the storage device, sometimes referred to as "disk blocks" or "allocation units."

Unfortunately, providing a separate physical device for storing the file system of each virtual private server would be expensive and inefficient. Accordingly, it would be desirable to store the file systems of multiple virtual private servers within the same physical device or comparatively small set of devices.

Figure 2:
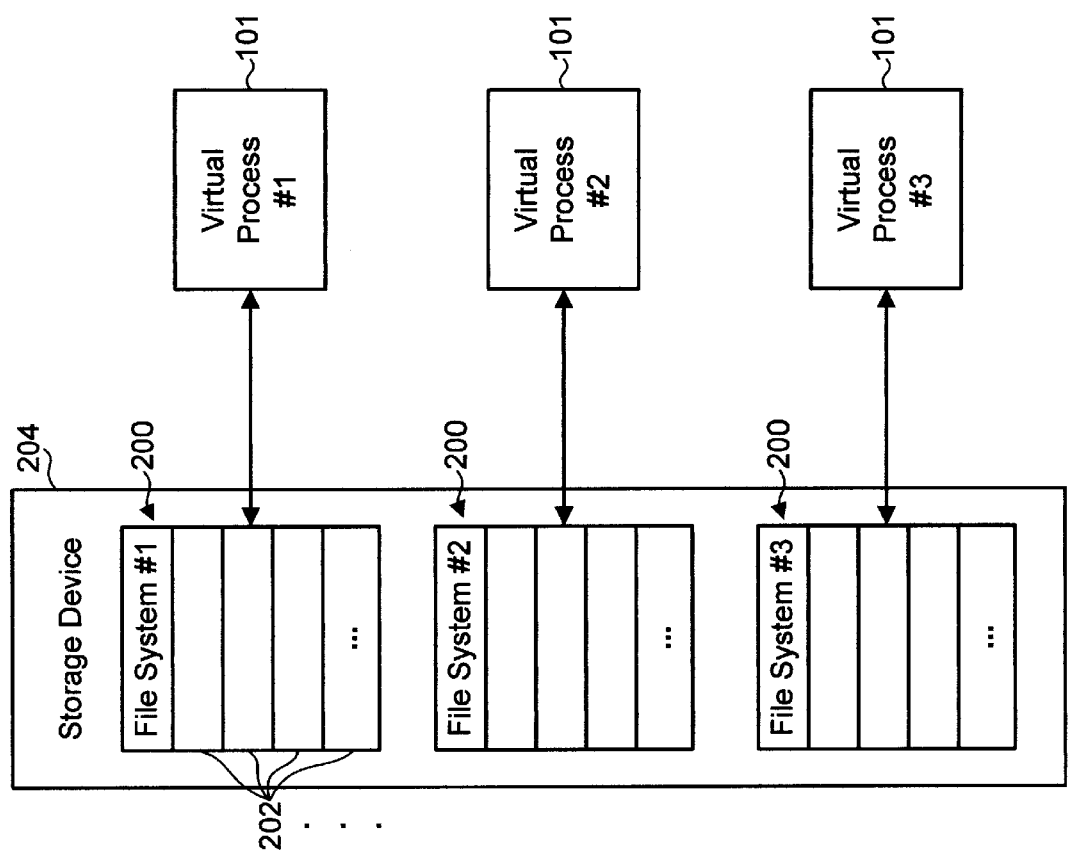
FIG. 2 is a block diagram of a storage device including the file systems of multiple virtual processes.

ServerXchange®, a product of Ensim Corporation, provides multiple virtual processes 101, such as virtual private servers, with separate file systems 200. As illustrated in FIG. 2, each file system 200 is stored in a linear set of equal-sized storage units 202 within the same physical storage device 204.

The approach still presents a number of difficulties, however. For example, an initial file system 200 including standard applications, utilities, databases, etc., must be duplicated for each virtual private server. Such a duplication process results in copying large amounts of data from one disk location to another, consuming significant amounts of time and placing substantial memory and disk load on the physical server. Such extensive duplication also results in wasted storage space, since all or part of the resulting file systems 200 are identical.

The above approach also presents difficulties when archiving (e.g., backing up) the file systems 200. For example, since the file systems 200 are being constantly changed by activity within the virtual processes 101, it is impossible to obtain a backup that is a "snapshot" of the files systems 200 at a particular time. By the time the backup process is complete (which may take several hours), the file systems 200 will have changed substantially. In addition, backing up such file systems 200 may result in a substantial waste of time and storage space due to the archival of duplicate data for each file system 200.

Figure 3:
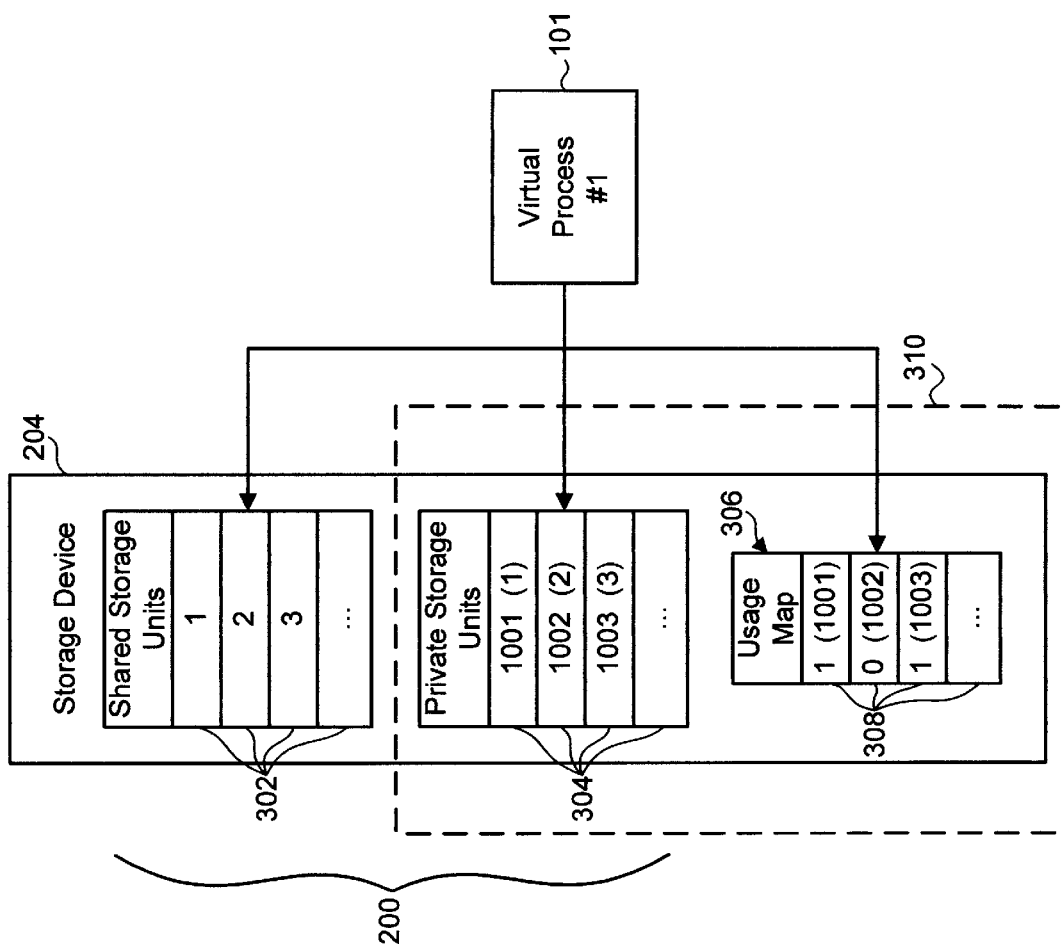
FIG. 3 is a block diagram of a storage device including a set of shared storage units, a set of private storage units, and a usage map.

As illustrated in FIG. 3, the foregoing problems are solved by providing a set of shared storage units 302 and a set of private storage units 304. In one embodiment, the set of shared storage units 302 is used to store data that is common to the files systems 200 of multiple virtual processes 101, such as standard application programs, utilities, databases, etc. The set of shared storage units 302 forms an initial file system 200 for each virtual process 101.

The set of private storage units 304, on the other hand, are used to store changes to the initial file system 200 that occur subsequent to the creation of the file system 200. Each private storage unit 304 preferably corresponds to one of the shared storage units 302. For example, as shown in FIG. 3, the number in parentheses within each private storage unit 304 refers to the corresponding shared storage unit 302.

While the private storage units 304 are depicted as being located within the same storage device 204 as the shared storage units 302, the invention is not limited in this respect. In alternative embodiments, the private storage units 304 may be located within a separate storage device 204, either within the same physical server or within a remote server.

In one implementation, a usage map 306 is also provided for each set of private storage units 304. The usage map 306 includes a plurality of indicators 308 for indicating whether a corresponding private storage unit 304 contains valid data. As used herein, the phrase "contains valid data" means that the private storage unit 304 stores data representing a change to the initial file system 200.

In one embodiment, the usage map 306 is embodied as a bitmap, with each indicator 308 comprising a single bit. For example, a bit with a value of 1 may indicate that a corresponding private storage unit 304 contains valid data, whereas a bit with a value of 0 may indicate the opposite. As depicted in FIG. 3, the number in parentheses within each indicator 308 refers to the corresponding private storage unit 304. In alternative embodiments, an indicator 308 may include more than a single bit in order to store additional information about a private storage unit 304, such as a modification or archival time, access rights, etc.

In one embodiment, the usage map 306 is initially reset or "initialized" to indicate that none of the private storage units 304 contain valid data. In the case of a bitmap embodiment, for example, all of the bits could be reset to 0.

In the depicted embodiment, the usage map 306 is stored in the same storage device 204 as the private storage units 304. Alternatively, the usage map 306 may be stored in a different storage device 204 or in the computer memory 102. In one implementation, a copy of the usage map 306 is cached in the computer memory 102 or in a memory integrated with the storage device 204 to provide high-speed access to the usage map 306.

Throughout the following description, a set of private storage units 304 for a virtual process 101 and a corresponding usage map 306 are collectively referred to as a "template" 310. While FIG. 3 illustrates only a single template 310, it should be recognized that at least one template 310 is preferably provided for each virtual process 101. As detailed below, the file system 200 of each virtual process 101 comprises a combination of the shared storage units 302 and the private storage units 304 from one or more templates 310.

Figure 4:
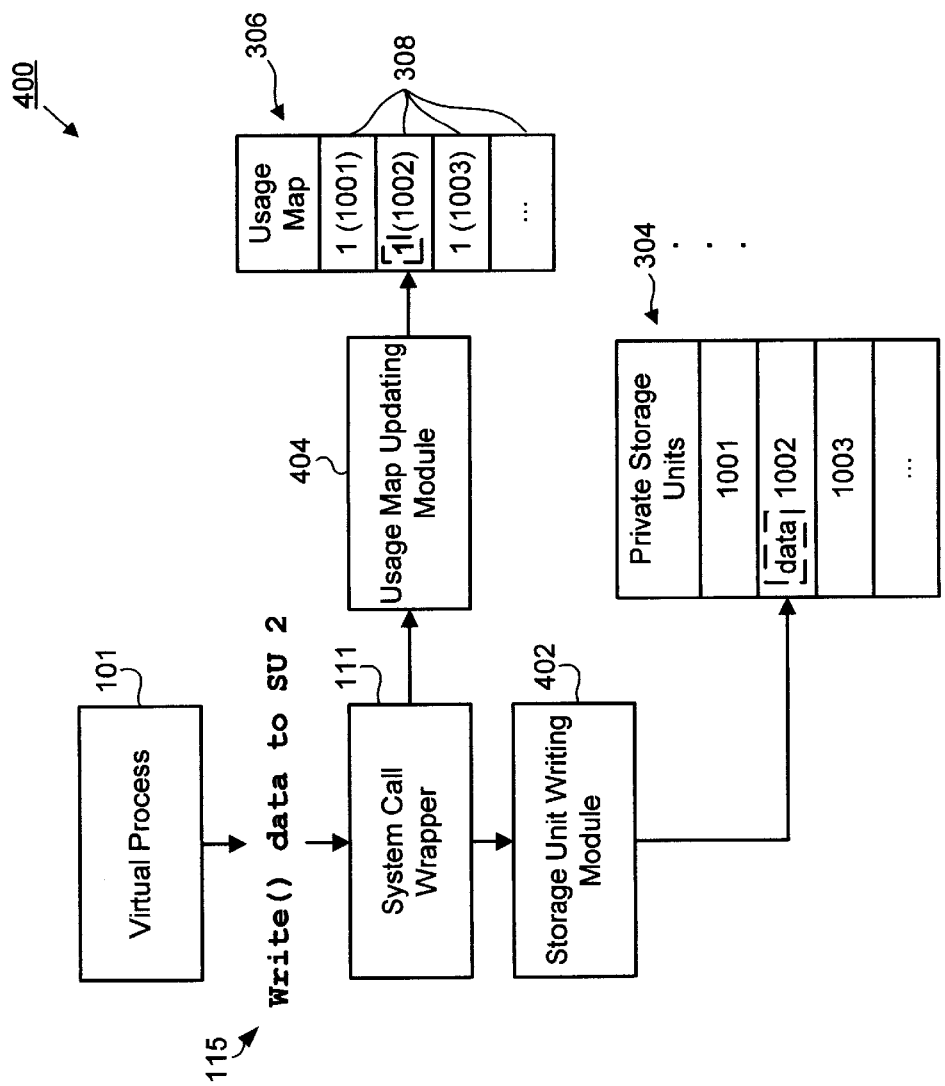
FIGS. 4–6 are block diagrams of a system for creating and managing a file system.
Figure 5:
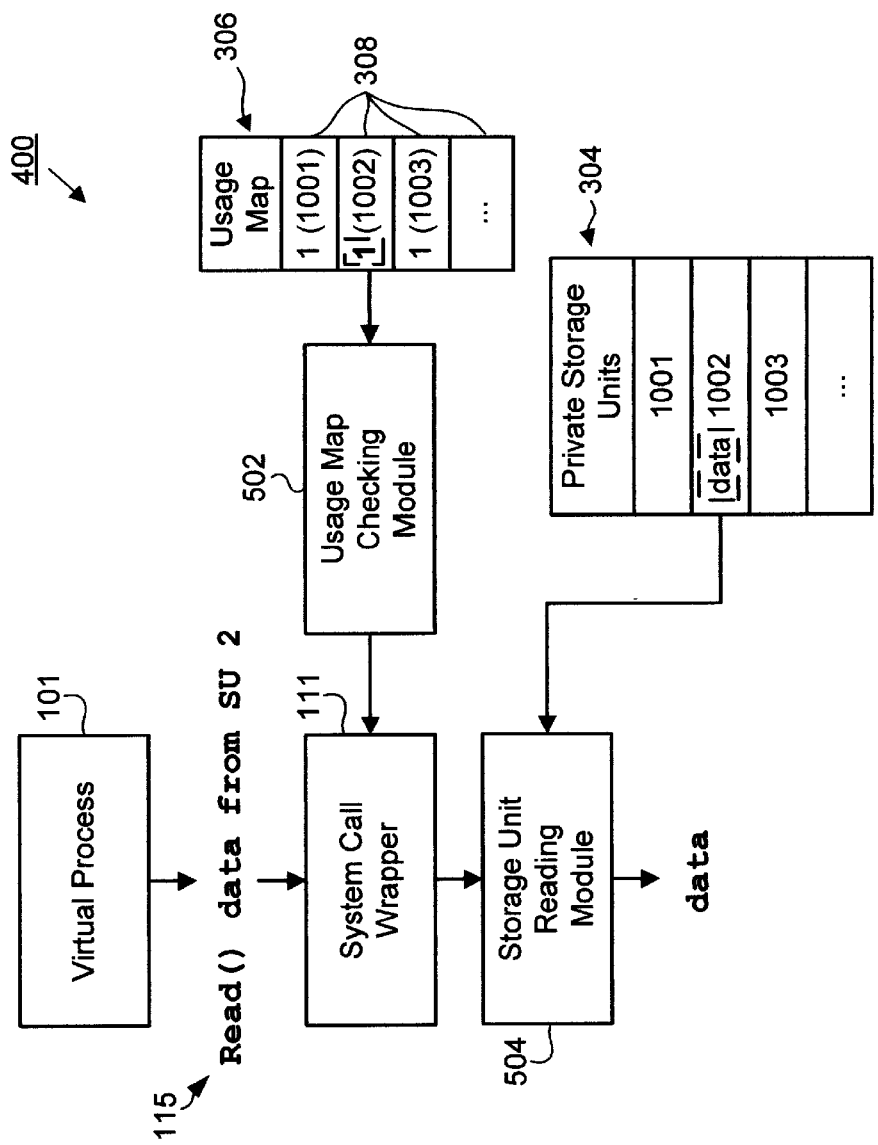
Figure 6:
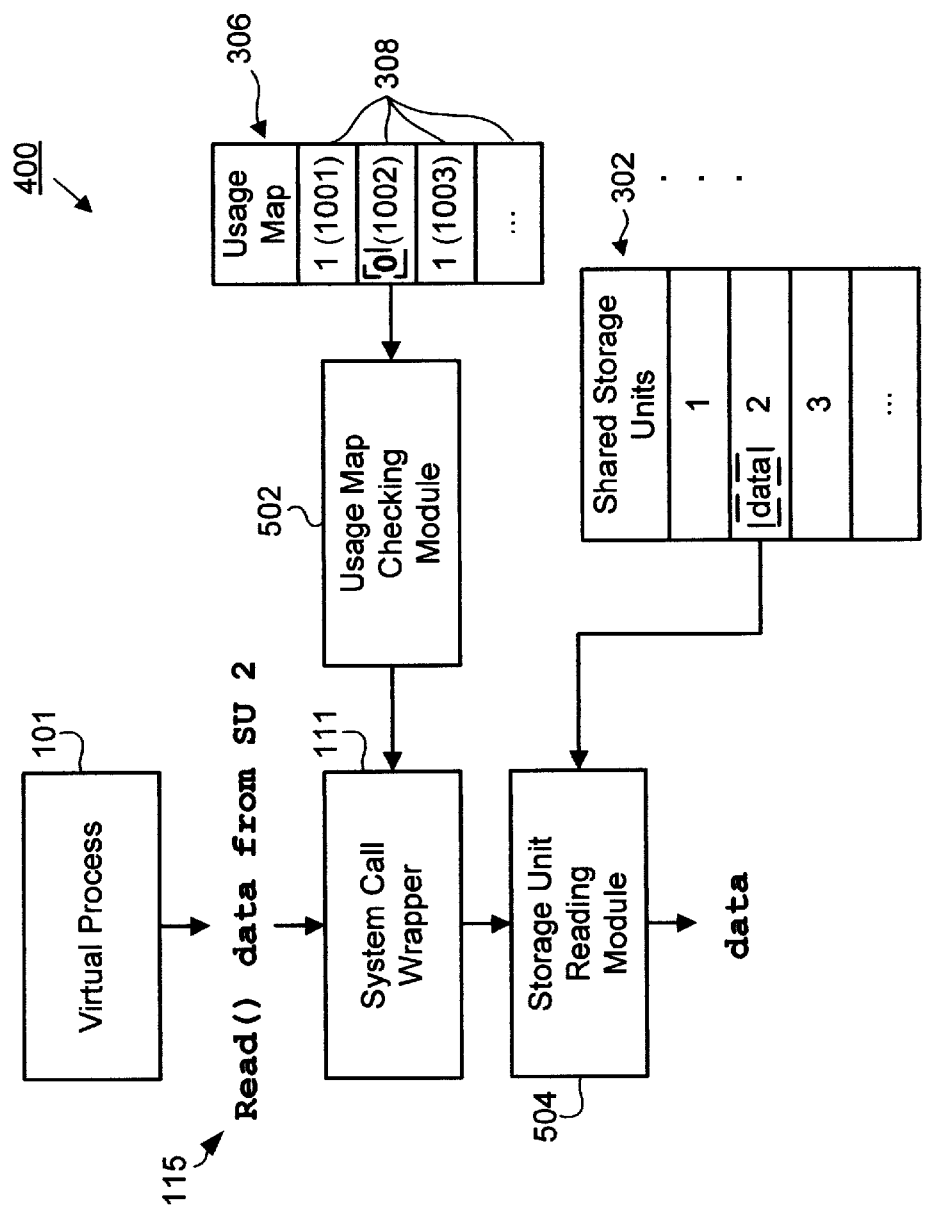

Referring now to FIGS. 4–6, there is shown a system 400 for creating and managing the file systems 200 of a plurality of virtual processes 101 according to an embodiment of the invention. In one implementation, a system call wrapper 111, as described with reference to FIG. 1, intercepts a system call 115 for writing a data item to a shared storage unit 202. Various system calls 115 may be intercepted, such as the UNIX® write( ) system call 115. Of course, the invention is not limited to any particular operating system.

Rather than writing the data item to the shared storage unit 302, however, a storage unit writing module 402 writes the data item to the corresponding private storage unit 304. In various embodiments, the storage unit writing module 402 may be implemented as a component of the system call wrapper 111 or, as depicted, a separate software module executing within either the user address space 103 or the operating system address space 105.

Additionally, a usage map updating module 404 stores an indication 308 in the usage map 306 that the private storage unit 304 (to which the data item is written) contains valid data. In the depicted embodiment, the usage map updating module 404 sets a bit in the usage map 306 that corresponds to the private storage unit 304. In various embodiments, the usage map updating module 404 may be implemented as a component of the system call wrapper 111 or, as depicted, a separate software module executing within either the user address space 103 or the operating system address space 105.

As illustrated in FIG. 5, the system call wrapper 111 is also configured, in one embodiment, to intercept a system call 115 for reading a data item from a shared storage unit 302. Various system calls 115 may be intercepted, such as the UNIX® read( ) system call 115. Of course, the invention is not limited to any particular operating system.

After the system call 115 for reading a data item is intercepted, a usage map checking module 502 checks for an indication 308 in the usage map 306 that the corresponding private storage unit 304 contains valid data. If it does, a storage unit reading module 504 reads the data item from the private storage unit 304 rather than the shared storage unit 302. In various embodiments, the usage map checking module 404 and the storage unit reading module 504 may be implemented as components of the system call wrapper 111 or, as illustrated, as separate software modules executing within either the user address space 103 or the operating system address space 105.

As shown in FIG. 6, if the usage map checking module 502 determines that the usage map 306 does not include an indication 308 of valid data for the corresponding private storage unit 304, then the storage unit reading module 504 reads the data item from the shared storage unit 302 specified in the intercepted system call 115.

Figure 7:
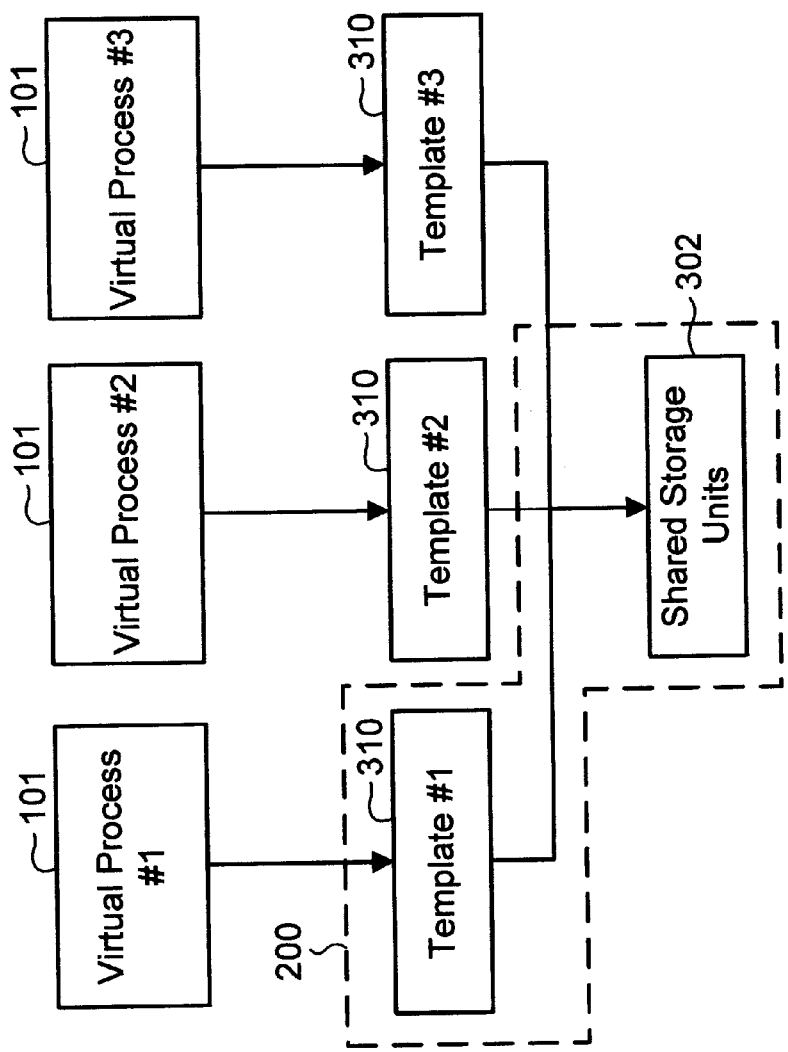
FIG. 7 is a block diagram of templates corresponding to different virtual processes.

Thus, as shown in FIG. 7, the file system 200 of each virtual process 101 may be conceptualized as a combination of the set of shared storage units 302 and the set of private storage units 304 from the corresponding template 310. Each attempt to write a data item to a shared storage unit 302 results in the data item being written to a private storage unit 304 in the template 310, with the usage map 306 being updated accordingly. Each attempt to read a data item from a shared storage unit 302 results in the data item being read from a private storage unit 304 (if the private storage unit 304 contains valid data) or, instead, from the shared storage unit 302.

A template-based approach to file system 200 creation and management is advantageous in a number of respects. For example, there is no need to duplicate an initial file system 200 for multiple virtual processes 101. Moreover, since all the virtual processes 101 use the same set of shared storage units 302, the shared storage units 302 may be easily cached for high speed access in the computer memory 102 or in a memory integrated with the storage device 204.

As noted, the sets of private and shared storage units 302, 304 may be stored within separate physical storage devices 204 in one embodiment. For example, the shared storage units 302 may be stored within a local storage device 204 to provide high-speed access thereto. The private storage units 304, on the other hand, may be stored within a remote, highly-reliable server to reduce the likelihood of losing the "changed" data.

The template-based approach is also advantageous in backing up the file systems 200. For example, a single backup may be made of the shared storage units 302 for all of the virtual processes 101. Thereafter, only the private storage units 304 for which an indication 308 of valid data is stored in the usage map 306 need to be backed up, reducing the time and storage space required for the backup.

Figure 8:
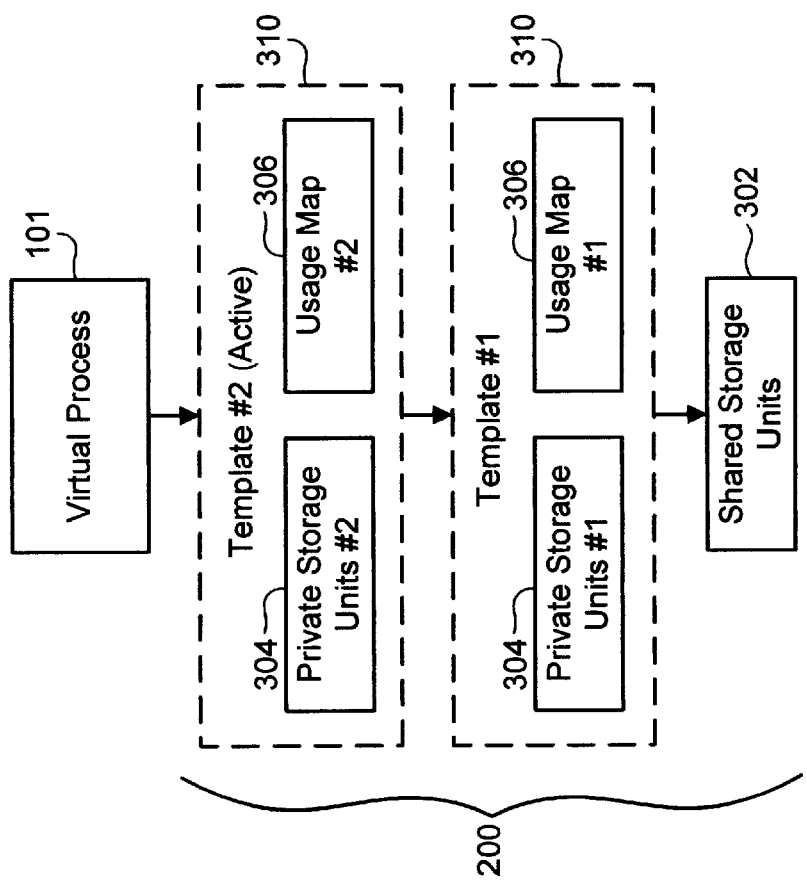
FIG. 8 is a block diagram of a stack of templates.

As shown in FIG. 8, a second template 310 may be added to the file system 200 of a virtual process 101. As before, each private storage unit 304 of the second template 310 corresponds to one of the shared storage units 302. However, when an attempt to write a data item to a shared storage unit 302 is intercepted, the data item is written, instead, to the corresponding private storage unit 304 of the second template 310. The template 310 to which the data item is written is referred to herein as the "active" template 310.

When a read attempt is intercepted, the usage map 306 of the second (active) template 310 is initially checked to determine whether the corresponding private storage unit 304 contains valid data. If it does, then the data item is read from the corresponding private storage unit 304 of the second template 310. If it does not, the usage map 306 of the first template 310 is checked to determine whether the corresponding private storage unit 304 contains valid data. If an indication 308 of valid data is found, the data item is read from the corresponding private storage unit 304 of the first template 310.

If, however, neither the usage map 306 of the second template 310 nor the usage map 306 of the first template 310 contain an indication 308 of valid data, then the data item is read from the shared storage unit 302 specified in the intercepted system call 115. As will be apparent from the above description, the second template 310 contains the changes to the file system 200 represented by the first template 310 and the set of shared storage units 302.

Any number of templates 310 may be added to the file system 200 in like manner. Accordingly, the file system 200 of a virtual process 101 may be conceptualized as a "stack" of templates 310, with the most recently created template 310 on the "top" of the stack. Each attempt to write a data item to a shared storage unit 302 results in the data item being written to the top (active) template 310 in the stack. Each attempt to read a data item from a shared storage unit 302 results in the data item being read from the corresponding private storage unit 304 of the topmost template 310 for which the usage map 306 contains an indication of valid data. Thus, each template 310 represents the changes to the file system 200 since that template 310 was added.

Figure 9:
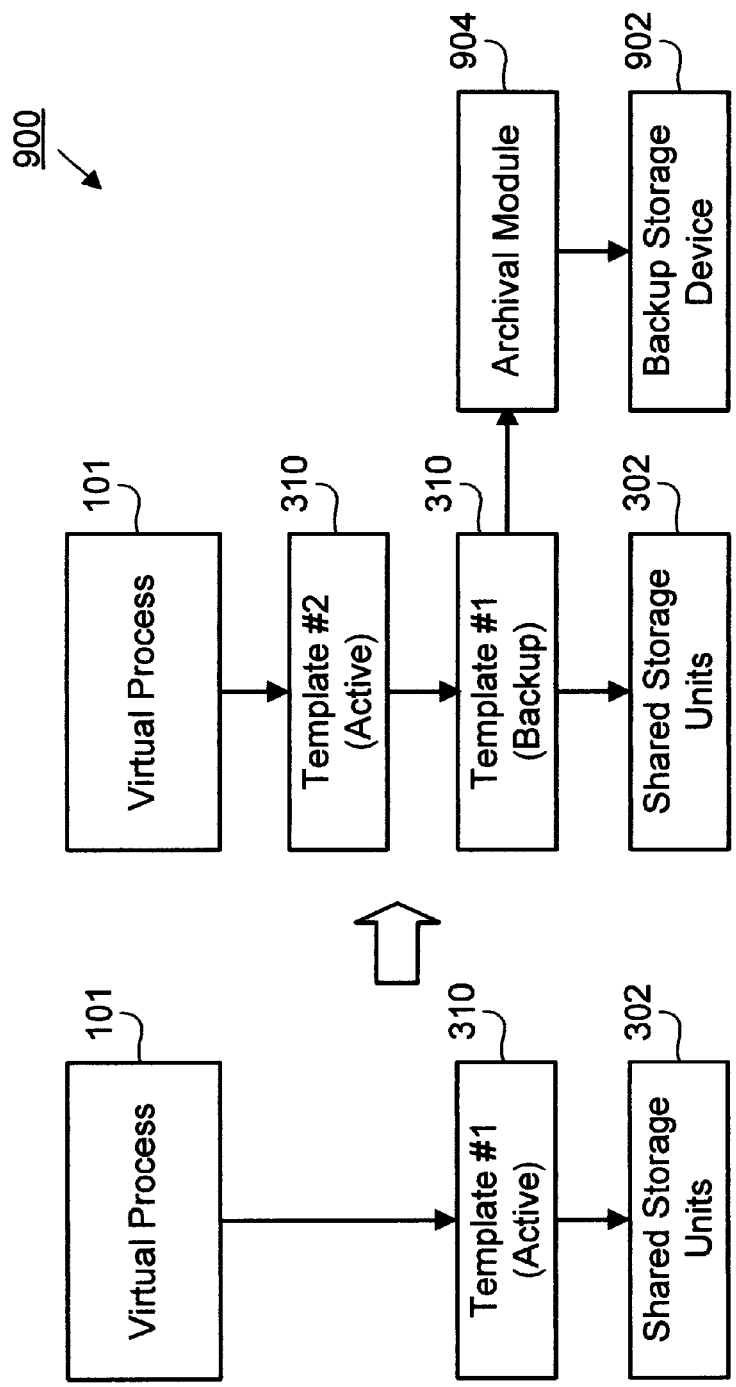
FIG. 9 is a block diagram an archival system.

Providing stacks of templates 310 is particularly useful in the archival context. FIG. 9 illustrates an archival system 900 according to an embodiment of the invention. In one implementation, a second template 310 is added when it is time to perform a backup of the file system 200. The second template 310 is designated as the active template 310, while the first template 310 is designated as a "backup" template 310.

Since data is subsequently written only to the second (active) template 310, the backup template 310 is a "snapshot" of the changes to the initial file system 200 at the time the backup process commences. Advantageously, only the private storage units 304 of the backup template 310 that contain valid data (as indicated by the usage map 306) need to be sent to a backup storage device 902, such as a hard disk drive, tape drive, optical storage device, etc., for archival. In one embodiment, the archival process is managed by an archival module 904, executing within either the user address space 103 or the operating system address space 105.

Figure 10:
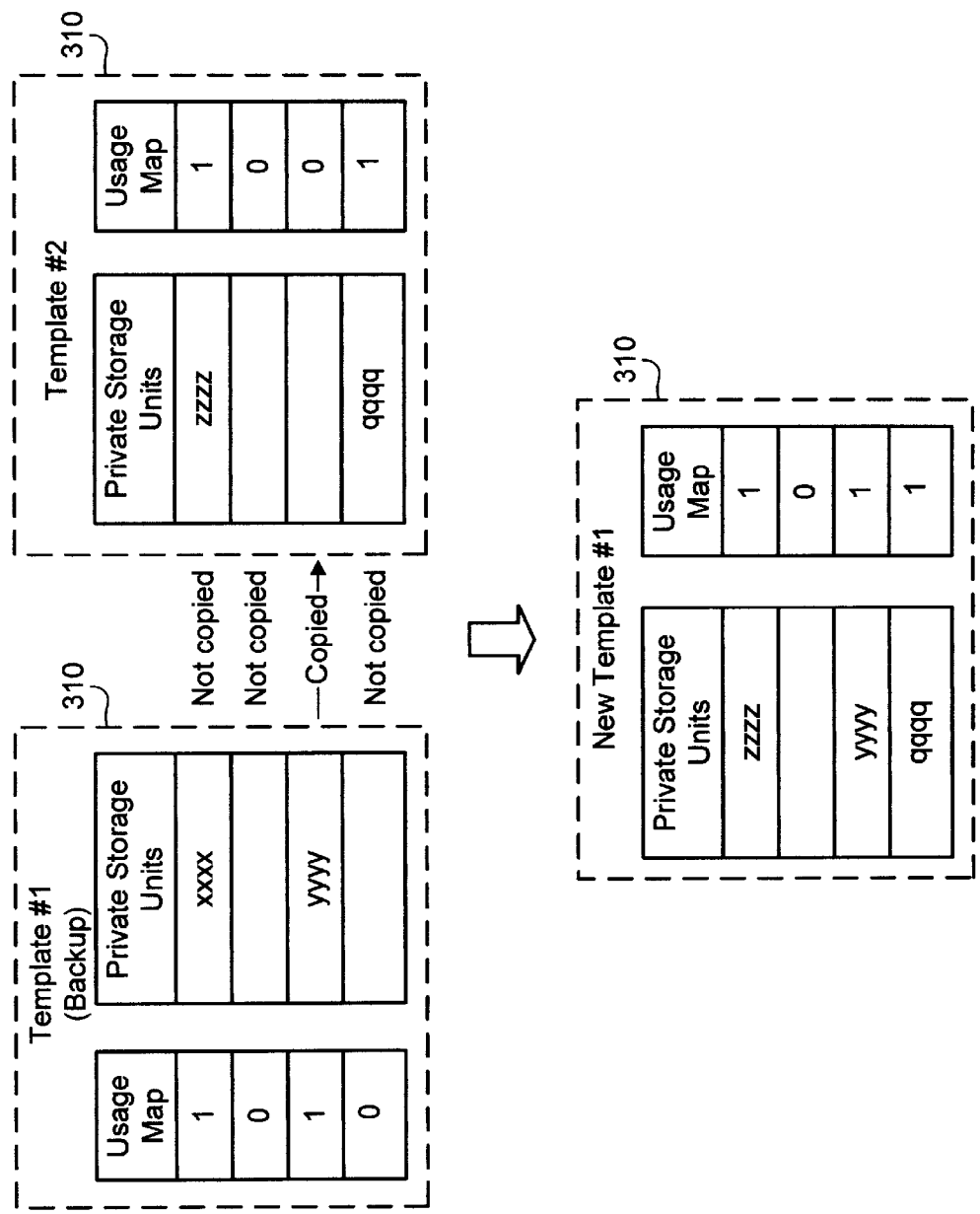
FIG. 10 is a block diagram illustrating a process of merging two templates.

When the archival process is complete, the first (backup) template 310 is merged with the second (active) template 310 in one implementation. During the merging process, as shown in FIG. 10, any private storage units 304 of the first template 310 that contain valid data are copied to those corresponding private storage units 304 of the second template 310 that do not contain valid data. For each private storage unit 304 that is copied, the corresponding indicator 308 in the usage map 306 of the second template 310 is set in order to indicate that the private storage unit 304 of the second template 310 now contains valid data.

When complete, the second template 310 represents all of the differences between the initial file system 200 (as represented by the shared storage units 302) and the current state of the file system 200. In one embodiment, the first (backup) template 310 is discarded and the second template 310 continues as the active template 310.

Figure 11:
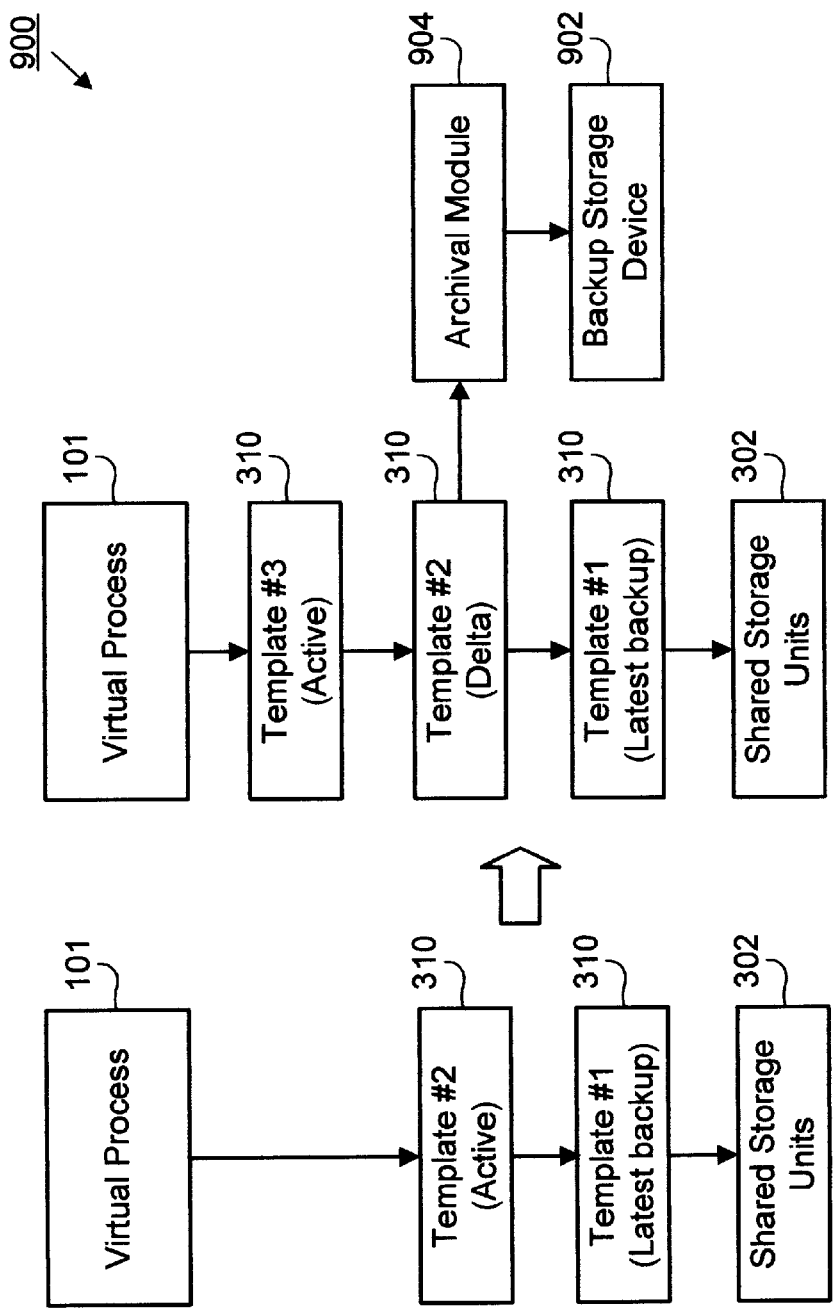
FIG. 11 is a block diagram of an archival system.

In an alternative embodiment, as shown in FIG. 11, three templates 310 may be used. The backup template 310 of FIG. 9 may be retained as a snapshot of the differences between the initial file system 200 and the file system 200 as it existed at the time of the latest backup. A second (active) template 310 is then added to receive all subsequent data writes.

When it is again time to back up the file system 200, the second template 310 may be re-designated as a "delta" template 310 and a third template 310 may then be added to receive all subsequent data writes. The delta template 310 represents the changes to the file system 200 since the latest backup (as represented by the first template 310).

In one embodiment, the private storage units 304 of the delta template 310 that contain valid data are then sent to the backup storage device 902 for archival. This is advantageous, when compared to the two-template approach of FIG. 9, in that only the changes since the last backup need to be archived.

In one embodiment, the first (latest backup) template 310 is merged with second (delta) template to form a new latest backup template 310, after which the old latest backup 310 may be discarded. The third template 310 continues to function as the active template 310 as the cycle begins anew.

Figure 12:
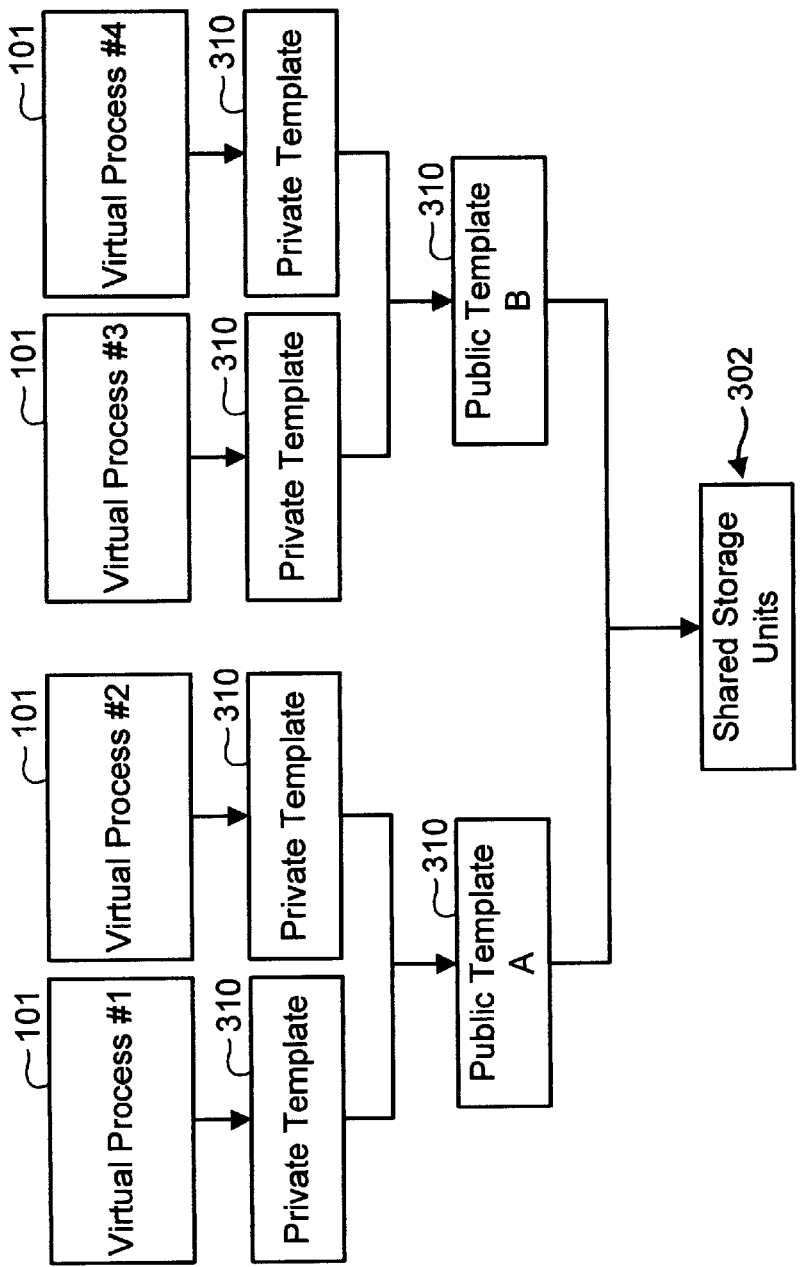
FIG. 12 is a block diagram of private and public templates.

The above-described templates 310 may be classified as "private" templates 310, since they relate to the private file systems 310 of different virtual processes 101. However, as shown in FIG. 12, "public" templates 310 may be used for one or more virtual processes 101 to provide, for example, different classes of file systems 200. Each class of file system 200 may include different installed applications, utilities, databases, etc.

For instance, an administrator or the like may begin with an initial file system 200 of the shared storage units 302 and create a first public template 310 that includes a set of installed applications. Thereafter, the administrator may begin again with the initial file system 200 and create a second public template 310 that includes a different set of installed applications. The first and second public templates 310 represent different sets of changes to the initial file system 200.

In one embodiment, the file system stack of each virtual process 101 includes one or more private templates 310, as previously described, one of the public templates 310, and the set of shared storage units 302. The above-described approach allows for rapid deployment of different classes of file systems 200 for a variety of types of virtual processes 101.

In the foregoing description, interception of system calls is illustrated as a primary vehicle for file system virtualization. However, virtualization at other levels is also contemplated. For example, virtualization may take place at a lower level, such as within a virtual disk device. In such an embodiment, the virtualization may occur once the file system code has turned a system call request into requests for particular blocks on the virtual block device.

In view of the foregoing, the present invention offers numerous advantages not available in conventional approaches. Separate file systems for a plurality of virtual private servers may be created without the need for extensive copying or wasted storage space. Moreover, the file systems may be efficiently backed up, with the backup representing a "snapshot" of the file system at the time of the backup.

As will be understood by those familiar with the art, the invention may be embodied in other specific forms without departing from the spirit or essential characteristics thereof. Likewise, the particular naming of the modules, features, attributes or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

I claim:

1. A method for file system creation and archival comprising:
   providing a first set of storage units and a second set of storage units, each storage unit of the first set corresponding to a storage unit of the second set;
   providing a first usage map for indicating which storage units of the second set contain valid data;
   intercepting an attempt to write a data item to a storage unit of the first set;
   writing the data item to the corresponding storage unit of the second set; and
   storing an indication in the first usage map that the corresponding storage unit of the second set contains valid data.

2. The method of claim 1, wherein the first and second sets of storage units are stored in a same storage device.

3. The method of claim 1, wherein the first set of storage units is stored in a local storage device and the second set of storage units is stored in a remote storage device.

4. The method of claim 1, wherein the first usage map comprises a bitmap, each bit of the bitmap indicating whether a corresponding storage unit of the second set contains valid data.

5. The method of claim 1, wherein providing a first usage map comprises:

initializing the first usage map to indicate that none of the storage units of the second set contain valid data.

6. The method of claim 1, further comprising:

intercepting an attempt to read a data item from a storage unit of the first set; and in response to the first usage map indicating that the corresponding storage unit of the second set contains valid data, reading the data item from the corresponding storage unit of the second set.

7. The method of claim 1, further comprising:

intercepting an attempt to read a data item from a storage unit of the first set; and in response to the first usage map indicating that the corresponding storage unit of the second set does not contain valid data, reading the data item from the storage unit of the first set.

8. The method of claim 1, further comprising:

providing a third set of storage units, each storage unit of the third set corresponding to one of the storage units of the first set;

providing a second usage map for indicating which storage units of third set contain valid data;

intercepting an attempt to write a data item to a storage unit of the first set; writing the data item to the corresponding storage unit of the third set; and storing an indication in the second usage map that the corresponding storage unit of the third set contains valid data.

9. The method of claim 8, wherein the second usage map comprises a bitmap, each bit of the bitmap indicating whether a corresponding storage unit of the third set contains valid data.

10. The method of claim 8, wherein providing a second usage map comprises:

initializing the second usage map to indicate that none of the storage units of the third set contain valid data.

11. The method of claim 8, further comprising:

intercepting an attempt to read a data item from a storage unit of the first set; and in response to the second usage map indicating that the corresponding storage unit of the third set contains valid data, reading the data item from the corresponding storage unit of the third set.

12. The method of claim 8, further comprising:

intercepting an attempt to read a data item from a storage unit of the first set; and in response to the second usage map indicating that the corresponding storage unit of the third set does not contain valid data and the first usage map indicating that the corresponding storage unit of the second set contains valid data, reading the data item from the corresponding storage unit of the second set.

13. The method of claim 8, further comprising:

intercepting an attempt to read a data item from a storage unit of the first set; and in response to the second usage map indicating that the corresponding storage unit of the third set does not contain valid data and the first usage map indicating that the corresponding storage unit of the second set does not contain valid data, reading the data item from the storage unit of the first set.

14. The method of claim 8, further comprising:

archiving each storage unit of the second set for which an indication of valid data is stored in the first usage map.

15. The method of claim 14, further comprising:

merging the second set of storage units with the third set of storage units.

16. The method of claim 15, wherein merging comprises:

copying the storage units of the second set that contain valid data to those corresponding storage units of the third set that do not contain valid data; and for each storage unit of the second set that is copied, storing an indication of valid data in the second usage map.

17. A method for creating and archiving file systems of a plurality of servers, the method comprising:

providing a set of shared storage units;

for each of the plurality of servers:

providing a first set of private storage units, each of the private storage units corresponding to a shared storage unit; and providing a first usage map for indicating which of the private storage units contain valid data;

intercepting an attempt to write a data item to a shared storage unit;

writing the data item to the corresponding private storage unit; and storing an indication in the first usage map that the corresponding private storage unit contains valid data.

18. The method of claim 17, wherein the file system of each server comprises a combination of the set of shared storage units and the first set of private storage units for the server.

19. The method of claim 17, further comprising:

storing a template comprising a copy of the first set of private storage units and the first usage map of a first server.

20. The method of claim 19, further comprising:

creating a file system for a second server using the stored template.

21. The method of claim 17, wherein the shared and private storage units are stored in a same storage device.

22. The method of claim 17, wherein the shared storage units are stored a local storage device and the private storage units are stored in a remote storage device.

23. The method of claim 17, wherein the first usage map comprises a bitmap, each bit of the bitmap indicating whether a corresponding private storage unit contains valid data.

24. The method of claim 17, wherein providing a first usage map comprises:

initializing the first usage map to indicate that none of the private storage units contain valid data.

25. The method of claim 17, further comprising:

intercepting an attempt to read a data item from a shared storage unit; and in response to the first usage map indicating that the corresponding private storage unit contains valid data, reading the data item from the corresponding private storage unit.

26. The method of claim 17, further comprising:

intercepting an attempt to read a data item from a shared storage unit; and in response to the first usage map indicating that the corresponding private storage unit does not contain valid data, reading the data item from the shared storage unit.

27. The method of claim 17, further comprising:

providing a second set of private storage units, each private storage unit of the second set corresponding to one of the shared storage units;

providing a second usage map for indicating which private storage units of second set contain valid data;

intercepting an attempt to write a data item to a shared storage unit;

writing the data item to the corresponding storage unit of the second set; and storing an indication in the second usage map that the corresponding storage unit of the second set contains valid data.

28. The method of claim 27, wherein the second usage map comprises a bitmap, each bit of the bitmap indicating whether a corresponding private storage unit of the second set contains valid data.

29. The method of claim 27, wherein providing a second usage map comprises:

initializing the second usage map to indicate that none of the private storage units of the second set contain valid data.

30. The method of claim 27, further comprising:

intercepting an attempt to read a data item from a shared storage unit; and in response to the second usage map indicating that the corresponding private storage unit of the second set contains valid data, reading the data item from the corresponding private storage unit of the second set.

31. The method of claim 27, further comprising:

intercepting an attempt to read a data item from a shared storage unit; and in response to the second usage map indicating that the corresponding private storage unit of the second set does not contain valid data and the first usage map indicating that the corresponding private storage unit of the first set contains valid data, reading the data item from the corresponding private storage unit of the first set.

32. The method of claim 27, further comprising:

intercepting an attempt to read a data item from a shared storage unit; and in response to the second usage map indicating that the corresponding private storage unit of the second set does not contain valid data and the first usage map indicating that the corresponding private storage unit of the first set does not contain valid data, reading the data item from the shared storage unit.

33. The method of claim 27, further comprising:

archiving each private storage unit of the first set for which an indication of valid data is stored in the first usage map.

34. The method of claim 33, further comprising:

merging the first set of private storage units with the second set of private storage units.

35. The method of claim 34, wherein merging comprises:

copying the private storage units of the first set that contain valid data to those corresponding private storage units of the second set that do not contain valid data; and for each private storage unit of the first set that is copied, storing an indication of valid data in the second usage map.

36. A system for creating and archiving a file system within at least one storage device comprising a first set of storage units and a second set of storage units, each storage unit of the first set corresponding to a storage unit of the second set, the system comprising:

a first usage map for indicating which storage units of the second set contain valid data;

an interception module for intercepting an attempt to write a data item to a storage unit of the first set;

a storage unit writing module for writing the data item to the corresponding storage unit of the second set; and a usage map updating module for storing an indication in the first usage map that the corresponding storage unit of the second set contains valid data.

37. The system of claim 36, wherein the first and second sets of storage units are stored in a same storage device.

38. The system of claim 36, wherein the first set of storage units is stored in a local storage device and the second set of storage units is stored in a remote storage device.

39. The system of claim 36, wherein the first usage map comprises a bitmap, each bit of the bitmap indicating whether a corresponding storage unit of the second set contains valid data.

40. The system of claim 36, wherein the first usage map is initially reset to indicate that none of the storage units of the second set contain valid data.

41. The system of claim 36, wherein the interception module is further configured to intercept an attempt to read a data item from a storage unit of the first set, the system further comprising:

a storage unit reading module configured, in response to the first usage map indicating that the corresponding storage unit of the second set contains valid data, to read the data item from the corresponding storage unit of the second set.

42. The system of claim 36, wherein the interception module is further configured to intercept an attempt to read a data item from a storage unit of the first set, the system further comprising:

a storage unit reading module configured, in response to the first usage map indicating that the corresponding storage unit of the second set does not contain valid data, to read the data item from the storage unit of the first set.

43. The system of claim 36, wherein the at least one storage device further comprises a third set of storage units, each storage unit of the third set corresponding to one of the storage units of the first set, the system further comprising a second usage map for indicating which storage units of third set contain valid data.

44. The system of claim 43, wherein the interception module is further configured to intercept an attempt to write a data item to a storage unit of the first set; wherein the storage unit writing module is further configured to write the data item to the corresponding storage unit of the third set; and wherein the usage map updating module is further configured to store an indication in the second usage map that the corresponding storage unit of the third set contains valid data.

45. The system of claim 44, wherein the second usage map comprises a bitmap, each bit of the bitmap indicating whether a corresponding storage unit of the third set contains valid data.

46. The system of claim 44, wherein the second usage map is initially reset to indicate that none of the storage units of the third set contain valid data.

47. The system of claim 44, wherein the interception module is further configured to intercept an attempt to read a data item from a storage unit of the first set, the system further comprising:

a storage unit reading module configured, in response to the second usage map indicating that the corresponding storage unit of the third set contains valid data, to read the data item from the corresponding storage unit of the third set.

48. The system of claim 44, wherein the interception module is further configured to intercept an attempt to read a data item from a storage unit of the first set, the system further comprising:

a storage unit reading module configured, in response to the second usage map indicating that the corresponding storage unit of the third set does not contain valid data and the first usage map indicating that the corresponding storage unit of the second set contains valid data, to read the data item from the corresponding storage unit of the second set.

49. The system of claim 44, wherein the interception module is further configured to intercept an attempt to read a data item from a storage unit of the first set, the system further comprising:

a storage unit reading module configured, in response to the second usage map indicating that the corresponding storage unit of the third set does not contain valid data and the first usage map indicating that the corresponding storage unit of the second set does not contain valid data, to read the data item from the storage unit of the first set.

50. The system of claim 44, further comprising:

an archival module configured to archive each storage unit of the second set for which an indication of valid data is stored in the first usage map.

51. The system of claim 50, further comprising:

a merging module configured to merge the second set of storage units with the third set of storage units.

52. The system of claim 51, wherein the merging module is further configured to copy the storage units of the second set that contain valid data to those corresponding storage units of the third set that do not contain valid data; and wherein the storage unit update module is configured, for each storage unit of the second set that is copied, to store an indication of valid data in the second usage map.

53. An computer program product for creating and archiving a file system within at least one storage device comprising a first set of storage units and a second set of storage units, each storage unit of the first set corresponding to a storage unit of the second set, the computer program product comprising:

a first usage map for indicating which storage units of the second set contain valid data;

program code for intercepting an attempt to write a data item to a storage unit of the first set;

program code for writing the data item to the corresponding storage unit of the second set; and program code for storing an indication in the first usage map that the corresponding storage unit of the second set contains valid data.

* * * * *